Figure 1:
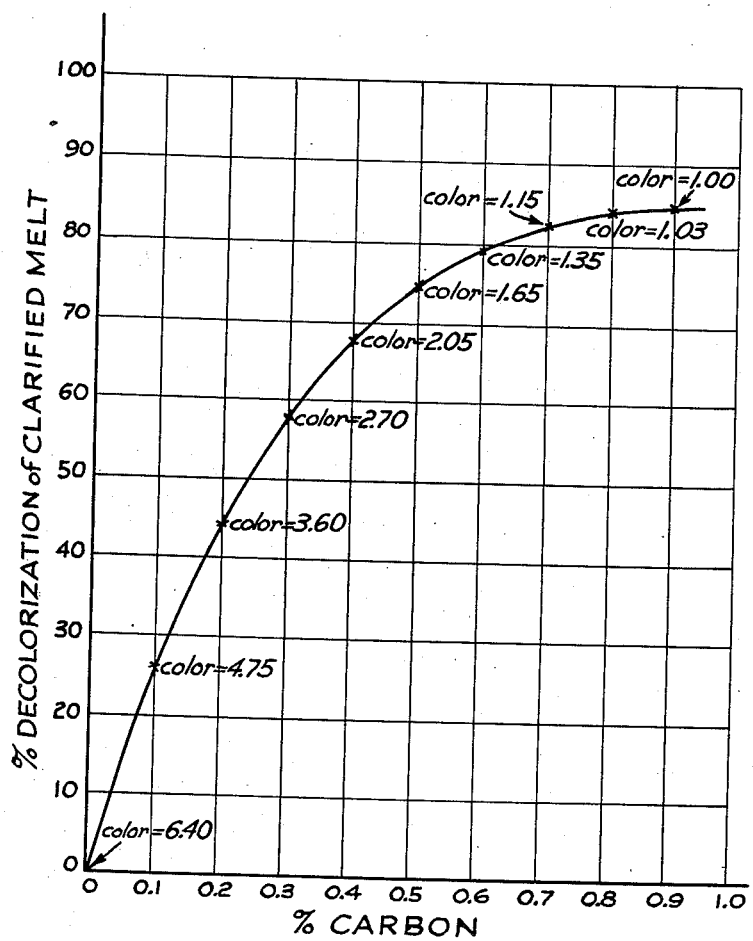

United States Patent Office 2,829,986
Patented Apr. 8, 1958

2,829,986
METHOD OF SUGAR REFINING

Eugene N. Ehrhart, New York, N. Y., assignor to Sucro-Blanc, Inc., New York, N. Y., a corporation of New York Application December 10, 1953, Serial No. 397,332

4 Claims. (Cl. 127—46)

The present invention relates to new and useful procedures for purifying and decolorizing impure sugar solutions and particularly relates to the refining of impure sugar solutions by the use of activated carbon and active chlorine wherein each is cooperatively employed in the proper sequence and in reduced amounts, to obtain much better purification and decolorization in a more economical way than has heretofore been achieved using either one separately.

The present invention is not an improved activated carbon process nor an improved active chlorine process for decolorizing impure sugar solutions and for the production of standard refined sugar but is a novel and useful process wherein both activated carbon and active chlorine are employed in the proper and complementary manner so that the useful and valuable properties of each are most effectively and efficiently employed and the shortcomings of each are avoided.

In using finely divided activated vegetable carbon processes for refining sugar, the practice is either to digest the carbon for about 15 to 30 minutes at about 185° F. with a melt of affined sugar or washed raw sugar or off-white impure sugar of purity higher than 98.5 and at a Brix of about 62, and then to remove the carbon by filtration to produce a decolorized syrup; or first to treat the melt with phosphoric acid or monocalcium phosphate and lime, heat and clarify the so treated sugar solution and thereafter digest the carbon with the clarified melt for about 15 to 30 minutes and filter out the carbon to produce a decolorized brilliant syrup for the crystallization of refined sugar.

In using decolorizing processes employing granular activated carbon of animal, vegetable or mineral variety, the sugar melt is either first mechanically filtered with diatomaceous filter aid, or clarified with acid phosphate and lime and the tricalcium phosphate removed or treated with lime and carbon dioxide gas and the precipitate of calcium carbonate removed, and the so filtered or clarified sugar melt percolated over the granular carbon.

In using active chlorine for refining sugar, a melt of affined or washed raw sugar of a purity higher than 98.5 of about 62° Brix is treated with about 75% of the calcium hypochlorite to be used together with phosphoric acid or monocalcium phosphate and lime and then heated and clarified; to the clarified melt being added about 25% of the calcium hypochlorite used in a plurality of stages in reducing amounts with about a ten minute interval between additions; and the so treated sugar solution filtered to produce a decolorized brilliant syrup of stable color for the crystallization of refined sugar.

A 62° Brix melt of washed sugar possessing a color on the Horne scale of 8.80 units of color was clarified with lime and phosphate. The clarified liquor possessed a color of 6.40 units per 100 Brix on the Horne scale. Aliquot portions of this clarified liquor were treated with 0.1%, 0.2% etc., activated carbon by heating and agitating for 20 minutes at 185° F. The so-treated liquors were filtered and their color determined as follows:

| Percent carbon on solids: | Color |
|---|---|
| 0.0 | 6.40 |
| 0.1 | 4.75 |
| 0.2 | 3.60 |
| 0.3 | 2.70 |
| 0.4 | 2.05 |
| 0.5 | 1.65 |
| 0.6 | 1.35 |
| 0.7 | 1.15 |
| 0.8 | 1.03 |
| 0.9 | 1.00 |

The results of these tests are set forth in Fig. 1 of the drawing.

The carbon used in the above tests was the best quality carbon on the market today for decolorizing sugar solutions. In order to boil the customary four successive straight strikes of the highest quality of refined sugar from a decolorized sugar liquor, a filtrate of color of 1.0 on the Horne Scale is highly desirable as the initial material. But to obtain this color it is seen from the curve of decolorization in Fig. 1 that about 0.9% carbon on solids in the melt would be needed. This is economically an excessive amount of carbon so most refiners settle for a color of filtrate of about 1.65, requiring 0.5% carbon, or a color of about 1.35, requiring no more than 0.6% carbon, being content to produce four mixed strikes of refined sugar of just passable color.

It is also to be noted from the chart, Fig. 1, that the decolorization curve rises in almost a straight line up to the point where about 0.3% carbon is employed. The conclusion to be drawn is that finely divided activated vegetable carbon is efficient in use up to a decolorization not exceeding about 50%, but becomes progressively more inefficient for the higher degree of decolorization needed for refining sugar.

Figure 2:
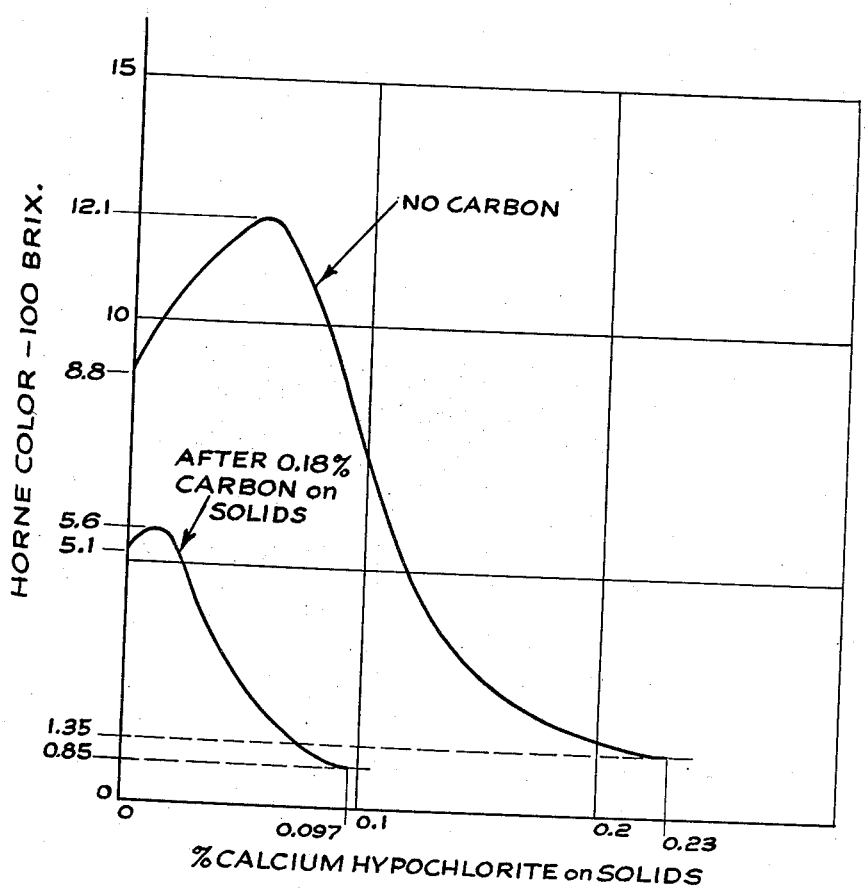

Let us now study the action of active chlorine, as calcium hypochlorite, when used to decolorize an impure sugar melt, as graphically shown in Fig. 2. For this purpose, a portion of the same melt was used as was used to provide the data shown on chart of Fig. 1.

To separate portions of the unclarified melt, there was added increasing quantities of calcium hypochlorite together with the quantity of lime and phosphate required to precipitate ash-forming ingredients all in accordance with the Sucro-Blanc Process, the color of the so clarified and so decolorized filtrate being determined with the results as set forth in Fig. 2. The initial color of the melt, 8.80 units of color on the Horne scale per 100 Brix, actually increased to a maximum of 12.1 with the first amounts of hypochlorite, and decrease in color was obtained only after this initial reaction has proceeded to completion. These results are shown in the upper graph of Fig. 2.

Again referring to Fig. 2, it is seen that while the melt was decolorized to a color of 1.35 by the use of 0.23% calcium hypochlorite on solids in the melt, the first quantity of the calcium hypochlorite used (about 25% of the total) darkened the sugar solution from 8.8 in color to 12.1; and that about 40% of the calcium hypochlorite was consumed before the melt was brought back to its original color of 8.8. The conclusion to be drawn is that about 40% of the calcium hypochlorite used was consumed, not in decolorizing the melt, but in first forming color and subsequently destroying the color formed by the reaction of the hypochlorite with the melt.

After comprehending what takes place on decolorizing an impure sugar melt with calcium hypochlorite, the present inventor set about finding out just what caused this waste of about 40% of the calcium hypochlorite used. Obviously the color formation was due to the reaction of calcium hypochlorite with something in the melt.

First of all, a pure white sucrose solution was treated, cold and hot, with calcium hypochlorite. No color at all was formed. Other constituents known to be present in the melt, such as invert sugars and inorganic salts were added, each separately and together, to the pure sucrose solution and the solution treated, hot and cold, with calcium hypochlorite without evidence of any color formation. But when amines and phenolic compounds of various kinds, known generally to be present in varying amounts in impure sugar, were added separately to the melt and the melt treated with calcium hypochlorite, color formation occurred, it being greatest when both amino and phenolic compounds were present together; and the color formation was the same as the characteristic color formation always occurring to a varying extent when treating any impure sugar solution with hypochlorite. The conclusion to be drawing is that certain organic compounds, most probably amino or phenolic compounds, and most likely both together present in the melt, is what causes the great inefficiency of use of calcium hypochlorite when treating a sugar solution, as shown in Fig. 2.

Comprehending the data revealed in charts of Fig. 1 and Fig. 2, and knowing that activated carbon is one of the finest and most powerful agents for removing organic compounds from impure sugar solutions, a portion of the same sugar solution was treated first with activated carbon and thereafter with hypochlorite with very fine results, both technically and economically.

The present inventor found that using 0.18% on solids in the melt of the finely divided activated carbon, removing the carbon by filtration, and treating the hot filtrate with 0.097% calcium hypochlorite on solids in the melt, the hypochlorite being used in four stages with decreasing amounts with a time interval of ten minutes between additions of the hypochlorite, gave a decolorized and brilliant filtrate of 0.85% on the Horne scale at 100 Brix which, after boiling in the vacuum pan to crystallize about 50% of the sugar, gave a massecuite color of 1.06. Technically, it is to be noted that the filtrate color of 0.85 is lower than can be obtained by treatment with either carbon or hypochlorite alone, without using uneconomical excessive amounts; and economically, taking into account that calcium hypochlorite costs just about twice as much per pound as activated carbon, the above procedure shows an importantly substantial saving in the cost of decolorizing. Fig. 2 shows graphically the decolorizing curve using 0.097% calcium hypochlorite after treatment with 0.18% activated carbon. Along with other results, it is of interest to note how little the sugar solution darkened on the addition of hypochlorite, even though the solution was treated hot, and how little hypochlorite was wasted.

In lieu of filtration, the carbon may be removed by a clarification process. Thus the melt and admixed carbon at about 150° F. is digested and treated with lime and phosphoric acid or monocalcium phosphate to form a floc, the so treated mixture then aerated and heated gradually to about 195° F. to induce convection currents in the melt. The tricalcium phosphate floc moves throughout the solution, picks up the carbon and carries the same to the top of the solution where it collects as a scum. The clarified subnatant sugar melt can then be drawn from the scum for treatment with hypochlorite. Other usual floc-forming materials other than lime and phosphoric acid or acid phosphate may be employed in the clarification for the removal of the carbon.

After admixture and digestion of the carbon with the melt, the carbon may also be removed by treating the melt with lime and carbon dioxide gas to form a crystalline precipitate of calcium carbonate, which precipitates along with the carbon may be removed by filtration; the filtrate being then treated with calcium hypochlorite.

When using any of the procedures employing first activated carbon to substantially remove from the sugar melt organic impurities, and particularly amino and phenolic compounds, but not necessarily in quantity sufficient to substantially decolorize the sugar melt, the sugar solution after hypochlorite treatment is practically odorless and without objectionable flavor in distinct contrast to the bad odor and flavor that the sugar solution has after treatment with hypochlorite alone.

Also, it is to be noted that in all of the procedures employing a carbon treatment prior to hypochlorite treatment, the hypochlorite treatment is carried out hot, in contrast with all of the prior teachings of the art that the treatment of the sugar melt, at least originally, must be carried out at room temperature, or below about 35° C.

Further investigation showed that the procedure of first substantially completely removing the organic impurities from the melt by treatment with activated carbon and then treating the filtrate with very small successive additions of calcium hypochlorite, with a time interval between additions provided a new and useful process for producing water white syrup, or white "liquid sugar," the color of which has to be less than 0.10 on the Horne scale at 100 Brix to be classed as No. 1 "liquid sugar" and not sold at a discount. A portion of the same melt as used in all of the foregoing examples was treated with 0.8% on solids in the melt, of the finely divided activated carbon, the carbon removed by filtration, and the filtrate then treated with 0.10% on solids in the melt, of calcium hypochlorite. A white syrup of 0.085 color on the Horne scale was obtained. To produce a white syrup of 0.10 color required 3.2% of activated carbon and could not be produced at all by treating the melt with calcium hypochlorite, irrespective of amount. These investigations show how marvelously efficacious and efficient is the activated carbon-active chlorine process for practically complete decolorization.

As the process might be deemed to be simply the use of two well known decolorizers, one after another, and that the result would be the same if the decolorizers were used in reverse, a portion of the same melt was first treated in the best known way with 0.097% of calcium hypochlorite on solids in the melt and then after filtration treated with 0.18% activated carbon on solids in the melt. The resulting filtrate was 3.1 in color. This is in contrast with the above example of a color of 0.85 being obtained when first using the carbon and the hypochlorite thereafter, as shown in Fig. 2.

Procedures other than the use of activated carbon for the elimination of objectionable organic impurities from the sugar melt prior to treatment with active chlorine were investigated, and the present inventor found that the organic bodies in the melt could be adsorbed to a more or less degree on hydrous inorganic compounds of relatively large surface area formed or produced within the sugar melt.

For instance, by treating the sugar melt with 0.04% $P_2O_5$ and lime at neutrality, these amounts being about the maximum that can be practically clarified out, heating and clarifying the solution, removing the calcium phosphate floc and treating the clarified solution hot with calcium hypochlorite, gave a saving in hypochlorite of about 10% on some sugar melts compared with treating the sugar melt in the conventional way with hypochlorite.

A saving of around 35% of hypochlorite resulted when sugar melts, prior to hypochlorite treatment hot, were first treated continuously at slightly above neutrality with 0.75% calcium hydroxide and carbon dioxide gas to form a precipitate of calcium carbonate and the precipitate filtered out to provide the filtrate for hypochlorite treatment.

In addition to the above, other agents or reagents providing large adsorbing surface areas in the melt may be used to provide flocs or precipitates for adsorbing organic impurities, and particularly amino and phenolic compounds, to a more or less degree, from the sugar melt prior to hypochlorite treatment.

In the following Example 1, the procedure used is the conventional preferred procedure when employing finely divided activated vegetable carbon for decolorizing affined sugar melts in the process of refining sugar following clarification of the melt with acid phosphate and lime; the clarification of the melt followed by carbon treatment being preferred over the treating of the melt with carbon without prior clarification of the melt, although the latter procedure is used in many sugar refineries not being equipped with clarifiers.

*Example 1*

A 62 Brix sugar solution was made from a typical affined sugar from a Cuban refinery. The color of the melt was 8.80 on the Horne scale at 100 Brix. To the melt at 50° C. was added 0.075% monocalcium phosphate and sufficient lime to give a neutral solution after clarification. The melt was then slowly heated to 195° F. and thereafter the subnatant brilliant clarified liquor removed from the scum of tricalcium phosphate and enmeshed and adsorbed impurities. The clarified liquor at 185° F. was digested with 0.6% on solids in the melt, of finely divided activated vegetable carbon, of the best quality on the market, for decolorizing sugar solutions for 20 minutes and the carbon filtered out. The color of the brilliant decolorized filtrate was 1.35 on the Horne scale at 100 Brix.

In the following Example 2, the procedure used is the present day conventional procedure employing high test calcium hypochlorite to decolorize sugar solutions in the process of refining sugar, and is widely known as the Sucro-Blanc process, the following procedure of Example 2 being the exact procedure at present being used by all Sucro-Blanc sugar refineries.

*Example 2*

To a portion of the melt used in Example 1, at 30° C. was added 75% of the total calcium hypochlorite to be used for decolorization, or 0.173%, on solids in the melt, together with 0.075% monocalcium phosphate, on solids in the melt, and sufficient time to give a neutral solution after clarification. After 15 minutes' stirring at 30° C., the solution was slowly heated to 195° F. and thereafter the subnatant brilliant clarified liquor removed from the scum of tricalcium phosphate and enmeshed and adsorbed impurities; the clarified liquor was then treated with the remaining 25% of the calcium hypochlorite, or 0.057%, on solids in the melt, the calcium hypochlorite being added all at one time. After about 3 minutes, 0.025% sodium hydrosulfite, on solids in the melt, was added to stabilize the color of the solution and to restrain color formation on further heating of the solution, and the so treated solution filtered. The color of the brilliant decolorized filtrate was 1.35 on the Horne scale.

The procedure of the following Example 3 utilizes the principles of the present invention and is a suggested commercial procedure of the present invention for the effective, efficient and economical purification and decolorization of the sugar melt used in the example. The example, however, is to be considered illustrative and not limitative as it is recognized that the principles of the present invention can be employed using different amounts and proportions of carbon and active chlorine to accomplish the same results or quite different results, if desired.

*Example 3*

A portion of the same sugar melt, of 8.8 color, as used in Examples 1 and 2 was digested at 185° F. for 20 minutes with 0.18% on solids in the melt, of the best quality finely divided activated vegetable carbon, the carbon being the same as used in Example 1. The carbon was then removed from the treated melt by filtration, giving a color of filtrate of 5.1 on the Horne scale at 100 Brix. The hot filtrate, at 185° F., was then treated with 0.0728%, 75% of the total calcium hypochlorite to be used, of the same quality calcium hypochlorite as was used in Example 2. After 10 minutes, 0.0122%, 12½% of the total hypochlorite used, more calcium hypochlorite was added; and then after ten minutes 0.006%, 6¼% of the total hypochlorite used, was added; and after 10 minutes the final 0.006% calcium hypochlorite was added. For the treatment a total of 0.097% calcium hypochlorite on solids in the melt, was used, the hypochlorite being added with continuous stirring and the temperature of the solution being maintained at 185° F. No sodium hydrosulfite was added after hypochlorite treatment. Thirty minutes after the final hypochlorite treatment, the treated solution was filtered. The filtrate had a color of 0.85 on the Horne scale at 100 Brix. The decolorization curve of this operation is graphically shown in Fig. 2.

The following Examples 4 and 5 cover procedures for the production of water white syrup or so-called commercial "No. 1 liquid sugar" of color lower than 0.10 on the Horne scale at 100 Brix. Example 5 employs the principles of the present invention, but this example, while a suggested commercial procedure, as to be considered illustrative and not limitative, as sugar melts of different qualities will require treatment with less or more activated carbon to sufficiently purify them of organic impurities, particularly amino and phenolic compounds present in the melt in order that they be properly prepared to satisfactorily respond to subsequent treatment with a very small amount of hypochlorite. No example is given of the treatment of the melt with hypochlorite for the production of water white "liquid sugar" as it is impossible to produce such a product using hypochlorite alone.

*Example 4*

Portions of the same melt used in Examples 1, 2 and 3, after clarification of the melt with acid phosphate and lime as in Example 1, were digested at 185° F. for 30 minutes with various amounts of carbon of quality as used in Examples 1 and 2 and it was found that it took no less than 3.2% of the carbon, on solids in the melt, to obtain a filtrate which, after concentration under vacuum to 68 Brix, produced a saturated sugar solution at ordinary temperatures of 0.10 color on the Horne scale at 100 Brix.

*Example 5*

A portion of the same melt used in all of the preceding examples was clarified as in Example 1 with acid phosphate and lime, and the clarified melt at 185° F. was digested for 30 minutes with 0.8% of the same quality activated carbon used in the preceding examples and the carbon removed by filtration. The filtrate was then treated at 185° F. with a total of 0.10%, on solids in the melt, of calcium hypochlorite of the same quality used in Examples 2 and 3, the hypochlorite being added in increments of 0.075%; 0.0125%; 0.00625% and 0.00625% with stirring with an interval of 10 minutes between additions of the hypochlorite. The so treated sugar solution was check filtered, using a small amount of diatomaceous filter aid and concentrated under vacuum to 68 Brix. The concentrated syrup had a pH of 6.5 and a color of 0.092 on the Horne scale at 100 Brix. The syrup was odorless and possessed no flavor foreign to a pure sucrose syrup.

What is claimed is:

1. In the manufacture of refined sugar the method of decolorizing sugar solutions which comprises digesting an aqueous sugar solution of impure sugar having a purity higher than 98.5 at a temperature in the neighborhood of 185° F. with about 0.06 to 0.30% on solids in the solution of activated carbon to purify the solution of organic non-sugar compounds which interfere with the effective and efficient decolorizing of the solution with active chlorine, separating the solution from the carbon, thereafter substantially decolorizing the hot solution with 0.035% to 0.15% on solids in the solution of active chlorine in the form of calcium hypochlorite and thereafter crystallizing refined sugar from the decolorized and high purity sugar solution.

2. In the manufacture of refined sugar the method of decolorizing sugar solutions which comprises digesting an aqueous sugar solution of impure sugar having a purity higher than 98.5 at a temperature of 120° F. to 150° F. with about 0.06% to 0.30% on solids in the solution of finely divided activated carbon to purify the solution of organic non-sugar which interfere with the effective and efficient decolorization of the solution with active chlorine, thereafter adding in the neighborhood of 0.035%, on solids in the solution, of soluble $P_2O_5$ and lime to neutralize the solution and to form a floc of calcium hypochlorite, heating the solution to a temperature of 180° F. to 200° F. to raise the floc together with the carbon to the surface of the solution, separating the solution from the floc and carbon by drawing off the solution, thereafter substantially decolorizing the hot solution with 0.035% to 0.15% on solids in the solution of active chlorine in the form of calcium hypochlorite and thereafter crystallizing refined sugar from the decolorized and high purity sugar solution.

3. In the manufacture of refined sugar the method of decolorizing sugar solutions which comprises digesting an aqueous sugar solution of impure sugar having a purity higher than 98.5 at a temperature in the neighborhood of 185° F. with about 0.06% to 0.30% on solids in the solution of activated carbon to purify the solution of organic non-sugar compounds which interfere with the effective and efficient decolorizing of the solution with active chlorine separating the solution from the carbon, thereafter substantially decolorizing the hot solution with 0.035% to 0.15% on solids in the solution of active chlorine in the form of calcium hypochlorite, the total calcium hypochlorite used being added to the hot solution in more than one portion, an interval of time of about 10 to 15 minutes being allowed to elapse between the additions of calcium hypochlorite and thereafter crystallizing refined sugar from the decolorized and high purity sugar solution.

4. In the manufacture of refined sugar the method of decolorizing sugar solution which comprises digesting an aqueous sugar solution of impure sugar having a purity higher than 98.5 at a temperature of 120° F. to 150° F. with about 0.06% to 0.30% on solids in the solution of finely divided activated carbon to purify the solution of organic non-sugar which interfere with the effective and efficient decolorization of the solution with active chlorine, thereafter adding in the neighborhood of 0.035%, on solids in the solution, of soluble $P_2O_5$ and lime to neutralize the solution and to form a floc of calcium hypochlorite, heating the solution to a temperature of 180° F. to 200° F. to raise the floc together with the carbon to the surface of the solution, separating the solution from the floc and carbon by drawing off the solution, thereafter substantially decolorizing the hot solution with 0.035% to 0.15%, on solids in the solution, of active chlorine in the form of calcium hypochlorite, the total calcium hypochlorite used being added to the hot solution in more than one portion, an interval of time of about 10 to 15 minutes being allowed to elapse between the additions of calcium hypochlorite and thereafter crystallizing refined sugar from the decolorized and high purity sugar solution.

References Cited in the file of this patent

UNITED STATES PATENTS

| | | |
|---|---|---|
| 1,176,999 | Wijnberg | Mar. 28, 1916 |
| 1,314,203 | Mumford | Aug. 26, 1919 |
| 1,606,216 | Gambel | Nov. 9, 1926 |
| 1,956,260 | Wadsworth et al. | Apr. 24, 1934 |
| 1,989,156 | Sanchez | Jan. 29, 1935 |
| 2,216,753 | Sanchez | Oct. 8, 1940 |
| 2,216,754 | Sanchez | Oct. 8, 1940 |
| 2,381,090 | Vincent | Aug. 7, 1945 |
| 2,430,262 | Vincent | Nov. 4, 1947 |